United States Patent [19]
Gonnello

[11] Patent Number: 5,107,614
[45] Date of Patent: Apr. 28, 1992

[54] SIGNALLING MEANS FOR USE IN FISHING THROUGH THE ICE

[76] Inventor: Lawrence J. Gonnello, 27 Lake Dr., Belchertown, Mass. 01007

[21] Appl. No.: 718,372

[22] Filed: Jun. 20, 1991

[51] Int. Cl.⁵ .............................................. A01K 85/01
[52] U.S. Cl. .................................................... 43/17
[58] Field of Search ................................ 43/17, 15, 16

[56] References Cited

U.S. PATENT DOCUMENTS

| | | | |
|---|---|---|---|
| 2,636,303 | 4/1953 | Feigley et al. | 43/17 |
| 2,720,719 | 10/1955 | Stancheck et al. | 43/17 |
| 3,359,673 | 12/1967 | Roemer | 43/17 |
| 4,310,983 | 1/1982 | Irvin et al. | 43/17 |

Primary Examiner—Richard K. Seidel
Assistant Examiner—James Miner
Attorney, Agent, or Firm—Ross, Ross & Flavin

[57] ABSTRACT

A device for use in ice fishing including means for paying out a line so that, upon the hooking of a fish, the line is swayed so as to effect a rotative motion in a horizontal plate to a reel and a reel support. The rotative motion releases a signalling device from a ready-to-operate position to an operative signaling position.

1 Claim, 3 Drawing Sheets

SIGNALLING MEANS FOR USE IN FISHING THROUGH THE ICE

BACKGROUND OF THE INVENTION

1. Field of the Invention

My invention relates to new and useful improvements relating to signal devices for use in fishing through the ice and specifically to an improved apparatus for signalling that a fish strike has occurred.

The primary object of the invention is to provide in combination a reel support shaft and a payout reel rotatively mounted thereon for reeling a line to be used as a fishing line and a releasable signal means capable of automatic release from a ready-to-operate position to a signalling position when the hook at the end of the fishing line is taken by the fish so as to indicate the fact to the fisherman who may be distantly therefrom at the moment.

2. Description of the Prior Art

A tip-up is an ice fishing apparatus known in the art which includes a base that spans a hole in the ice, a reel assembly wound with a fishing line, a trigger mechanism, and a means for signaling the user upon the incidence of a fish strike. U.S. Pat. Nos. 2,654,176 and 4,727,673 show representative tip-ups. U.S. Pat. No. 4,616,437 shows an alternate ice fishing apparatus that mounts above a hole in the ice and signals the user when a fish is snagged.

Since the reel is out of view, a signalling device must be provided to inform the fisherman that a fish is on the line. Some form of mechanical linkage is connected to the fish line and controls a flag or other signalling device which pops up or otherwise moves to indicate the presence of a fish on the line. Other examples of these types of devices are shown in U.S. Pat. Nos. 2,170,000, 2,955,374, and 4,121,367, the last cited being Applicant's own patent.

Tip-ups and other similar ice fishing apparatuses enable the fisherman to leave the fishing site for a warm location or to attend to other activities, though the fishing site must still be monitored, even at a distance.

SUMMARY OF THE INVENTION

In accordance with the present invention, an ice fishing apparatus and signaling device includes novel modifications to a conventional tip-up which transmits a signal to the fisherman upon the incidence of a fish strike.

The apparatus includes a tripod arrangement which spans a hole in the ice and supports a reel support member which is vertically disposed in manner to allow a lower portion thereof to depend through the hole and into the water therebelow.

The reel support supports in fixed relationship a transversely extending pin which mounts a rotatable reel from which a fishing line with hook is payable out.

Adjustable tensioning means is provided to control the degree of free rotative movement of the reel upon the pin.

A resilient band is slidable in vertical directions relative to the vertically-disposed reel support and is flexible to the extent that its upper portion may be bent over into a locking position when in the ready-to-operate mode and to be released therefrom for unbending into an upright signalling position when in the operative mode.

The releasing is effected merely by the pulling and tugging of a hooked fish having nibbled at the line. Becoming snagged in the hook, the reel is caused to rotate along a vertical axis thereby causing rotation of the reel support and resulting in the release of the band from its latched position and into an upright position to provide a visual signal to the fisherman that a fish strike has occurred.

The invention is characterized by the ease with which it can be collapsed into a small compass for transportation with little, if any, danger of losing its parts or tangling of its line; by the readiness with which it can be set up for fishing on the ice; by the fewness of its parts, by the readiness with which it may be removably secured in inutile but readily accessible position; by its stability on the ice and its positiveness of operation, and by its lightweight, sturdiness, and simplicity of construction.

DESCRIPTION OF THE PREFERRED EMBODIMENT

Figures 4, 5, 6:
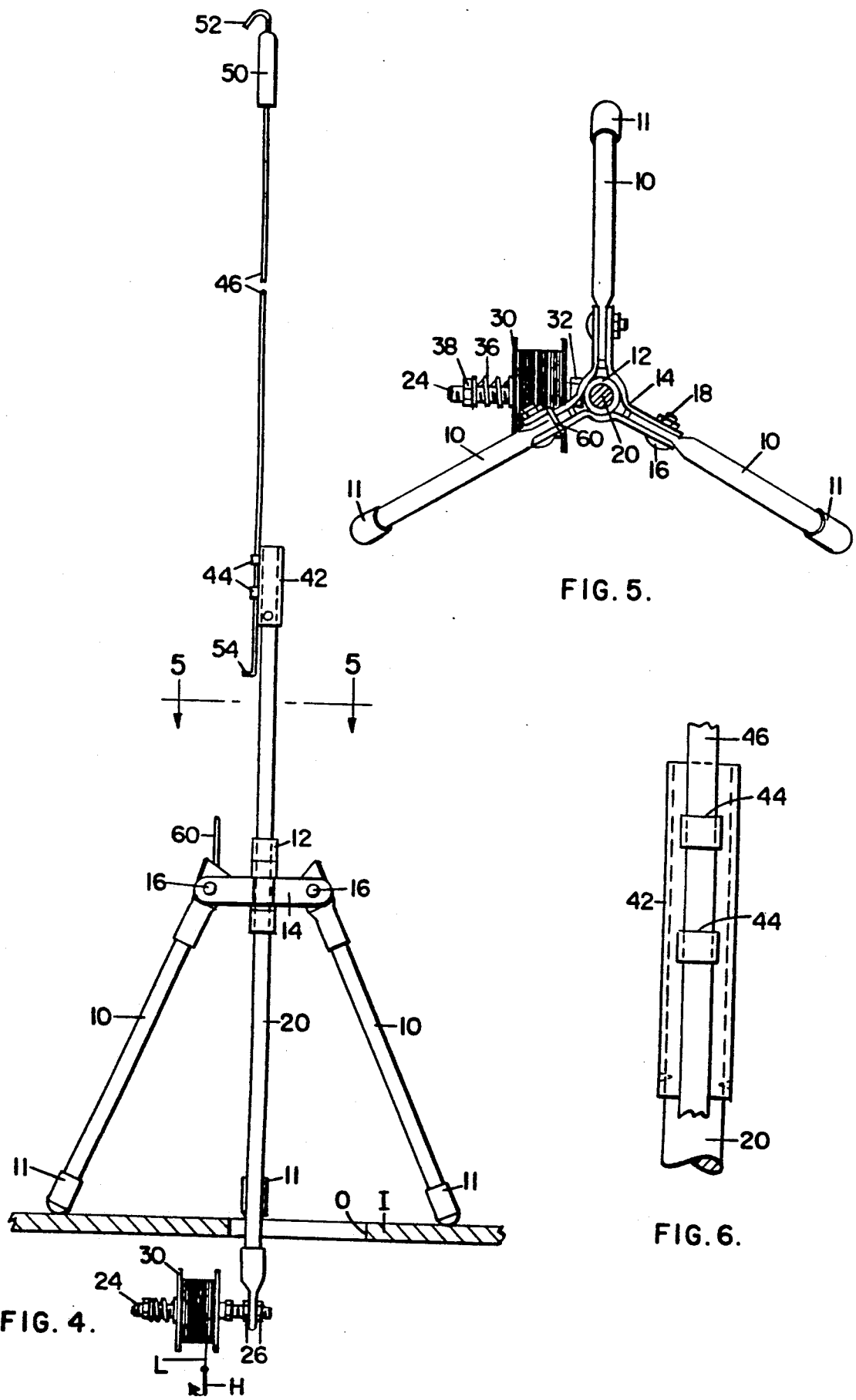
FIG. 4 is a view, in front elevation, of the device showing the signal means in unlatched position following the rotative movement of the reel and reel support shaft.
FIG. 5 is a sectional view, on line 5—5 of FIG. 4.
FIG. 6 is an enlarged fragmentary view in front elevation showing the slide keeper for the signal means.

The device includes a trio of tripod legs 10, equispaced from each other at 120° angles and angularized as to each other so as to converge at their upper extremities toward a sleeve 12 from which complemental radially projecting wings 14 extend outwardly, each wing being pivotally engaged with a pair of adjacent legs by means of bolts 16 and nuts 18, as best shown in FIG. 5.

A vertically-disposed reel support shaft 20 is extendable through sleeve 12, the sleeve being positively secured to the support shaft by any suitable means, with the lower terminus of the support shaft being extendable downwardly through a provided opening O in ice I.

The lower end portions of legs 10 are shown as provided with caps 11, but it is to be understood that, alternatively, the legs may be sharpened to points to allow them to be engaged firmly in the ice circumadjacent the fishing hole.

In transversely extending position and fixed to the lower end of the reel support shaft by extension therethrough is a threaded reel pin 24, the pin being held fast to the shaft by means of nuts 26 on opposite sides of the shaft.

A reel 30 may be freely rotatable on reel pin 24 and is held in outwardly spaced relation from the support shaft on its inboard side by means of an inboard nut 32 and washer 34 with a tightenable means on its outboard side in the form of a spring 36 sleeved upon the reel pin and embracing the outboard face of the reel and tightenable by means of an adjusting nut 38 threaded on the reel pin.

The upper extremity of the reel support shaft is provided with a tubular keeper 42 sleeved upon and held in fixed position relative to the shaft.

The keeper is provided with one or more bifurcations defining slots 44 for the passage therethrough of a slidable resiliently flexible steel strip 46 which may carry a flag 50 suitably secured thereto at its upper end portion together with a small hook 52 projecting from the outer end of the flag.

Being slotted, the keeper allows the sliding of strip 46 vertically relative to the reel support shaft, the dimensioning being such that the strip is held frictionally relative to the shaft at any desired position.

The lower extremity of the strip is provided with an offset or tail 54 so as to preclude unwanted separation of strip and keeper.

The flag will be permanently fixed to the strip and preferentially of a contrasting color so as to be clearly visible from a distance when in the signaling position to be described.

Extendable upwardly from one of the legs 10 and in a freely projecting manner is a latch 60 of inverted L shape.

Figures 1, 2:
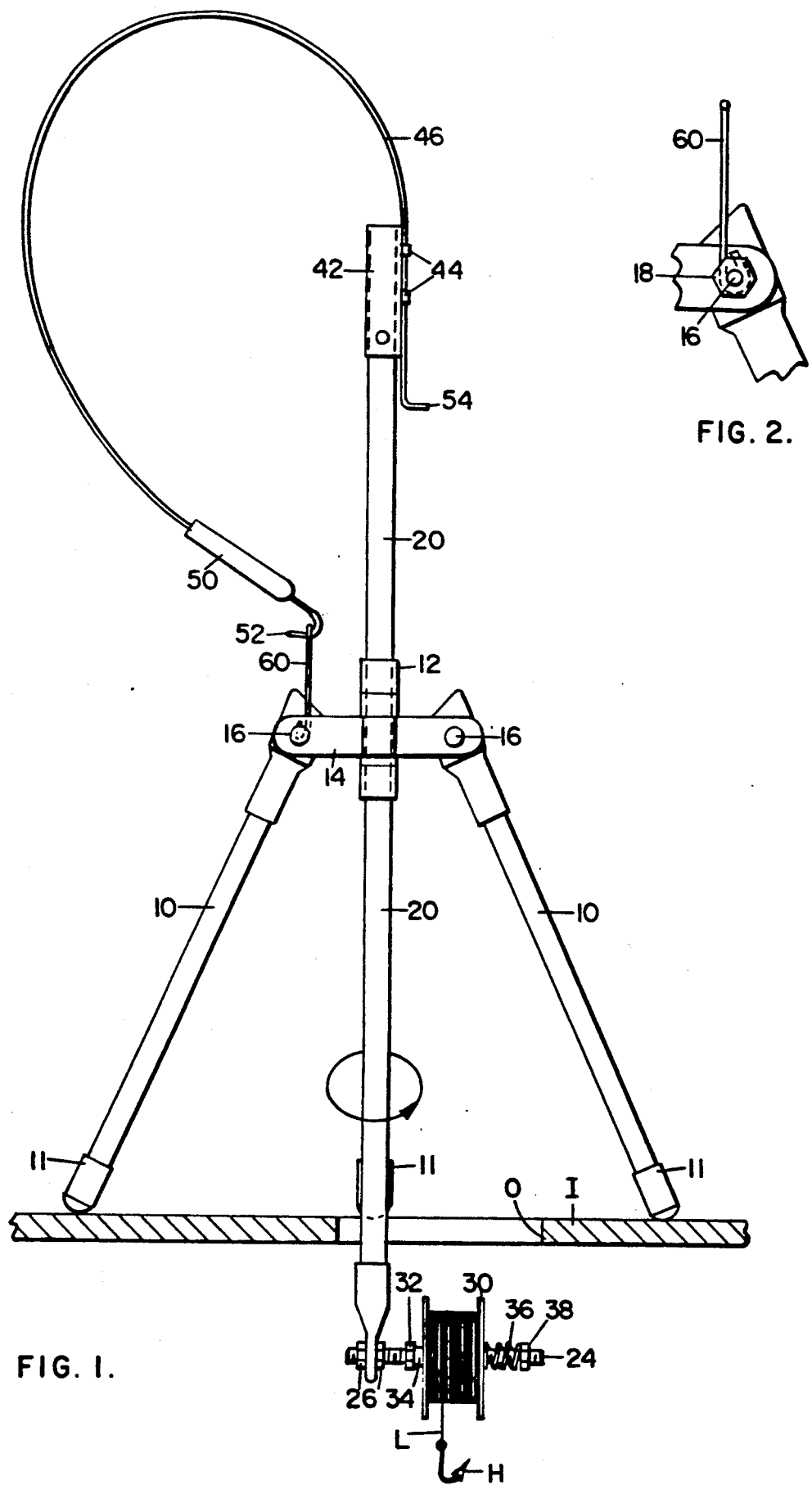
FIG. 1 is a view, in front elevation, of the device of the invention, showing the signal means latched in ready-to-operate position.
FIG. 2 is an enlarged, fragmentary view in rear elevation of the latch means of the invention.
Figure 3:
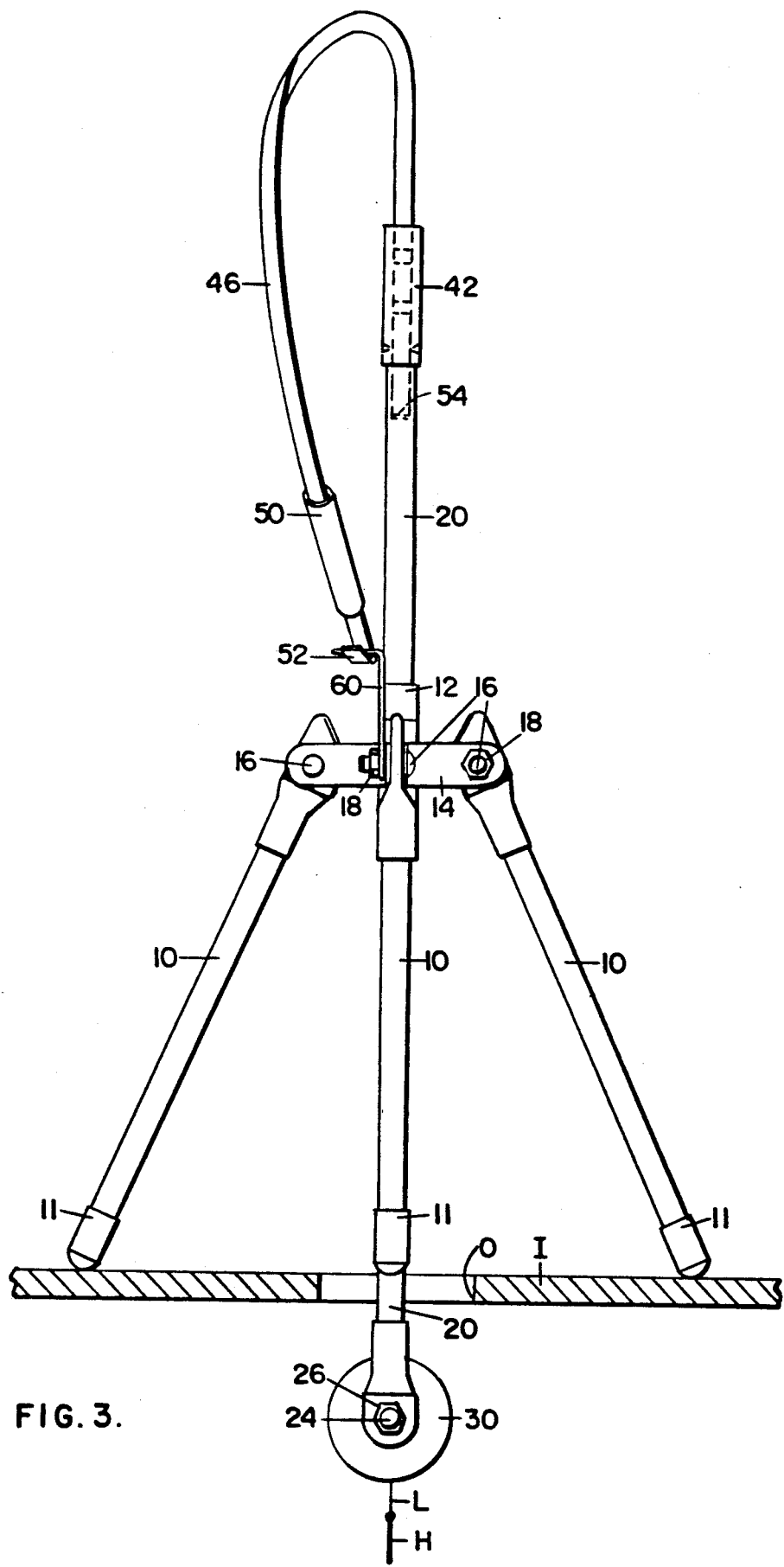
FIG. 3 is a view, in side elevation, taken from the left of the FIG. 1 showing.

In setting the device, strip 46 is flexed downwardly with its hook 52 engaging latch 60 and being held thereby as shown in FIG. 1.

When a fish pulls on the line, the pulling or flailing movement of the fish will cause reel 30 and reel pin 24 to traverse along a horizontal plane and, accordingly, will cause reel support shaft 20 to rotate through a small angle sufficient to bring about the disengagement of strip 46 from latch 60 so that the strip will fly upwardly into upright signalling position.

I claim:

1. An automatic ice fishing tip-up comprising:

a trio of legs equispaced from each other and converging toward and connected at their upper extremities to an annular sleeve from which a trio of interdigitated radially projecting wings are held in pivotal relation with respective adjacent pairs of the legs in an tripod-defining manner for supporting the tip-up relative to the ice surface in bridging relation with an ice hole, a vertically-disposed reel support shaft supported by and fixed to the sleeve for the extension of the lower portion of the shaft into and through the ice hole, a reel support pin disposed in fixed transversely-extending position relative to the lower terminus of the shaft, a reel sleeved in a freely rotatable manner on the reel support pin, an adjustable tightening means on the pin for tensioning the position of the reel relative to the pin, a fishing line carrying a fish hook on its outboard extremity and wound upon the reel for payout therefrom, a flexible resilient signal-carrying strip mounted in a normally upright position and slidably adjustable relative to the upper potion of the shaft for positioning the strip at any desired position therealong, a latch of inverted L shape fixed to and projecting upwardly from one of the tripod wings, a hook on the upper free extremity of the strip and adapted for releasable engagement with the latch by the inverting of the upper strip extremity into a holding tensioned position of hook and latch interengagement as long as the shaft and sleeve are stationary, and the pin and shaft being rotatable unisonly in a counterclockwise direction as a fish is snagged on the hook so as to pull on the line and release the hook from the latch for the return of the strip to an upright signalling position.

* * * * *